United States Patent [19]

Avelöv

[11] Patent Number: 4,901,916
[45] Date of Patent: Feb. 20, 1990

[54] THERMOSTATIC MIXING VALVE

[75] Inventor: Rolf I. Avelöv, Mjölby, Sweden

[73] Assignee: Danfoss A/S, Nordborg, Denmark

[21] Appl. No.: 295,066

[22] Filed: Jan. 6, 1989

[30] Foreign Application Priority Data

Jan. 8, 1988 [DE] Fed. Rep. of Germany ....... 3800303
Jun. 7, 1988 [DE] Fed. Rep. of Germany ....... 3819420

[51] Int. Cl.⁴ ............................................. G05D 23/13
[52] U.S. Cl. ................................. 236/12.16; 137/270; 137/360
[58] Field of Search ..................... 236/12.1, 12.16, 12.2; 137/270, 360; 4/192

[56] References Cited

U.S. PATENT DOCUMENTS

| | | | |
|---|---|---|---|
| 2,233,267 | 2/1941 | McGarry | 137/360 |
| 2,527,836 | 10/1950 | Miller | 236/12.15 |
| 3,034,138 | 5/1962 | Filliung | 4/192 |
| 3,175,575 | 3/1965 | Kennedy | 137/360 |
| 4,423,752 | 1/1984 | Psarouthakis | 137/270 X |
| 4,458,839 | 7/1984 | MacDonald | 236/12.16 |
| 4,508,137 | 4/1985 | Bolgert | 137/360 X |
| 4,700,885 | 10/1987 | Knebel | 236/12.1 X |
| 4,785,845 | 11/1988 | Kochal | 4/192 X |
| 4,804,011 | 2/1989 | Knapp | 137/270 |

Primary Examiner—William E. Tapolcai
Attorney, Agent, or Firm—Wayne B. Easton; Clayton R. Johnson

[57] ABSTRACT

A thermostatic mixing valve has a connection housing and an attachment housing which are joined together at abutting surfaces. The connection housing has hot, cold and mixed water passages which mate with respective hot, cold, and mixed water passages in the attachment housing. The attachment housing further has valve means for controlling the temperature and quantity of the mixed water.

11 Claims, 3 Drawing Sheets

THERMOSTATIC MIXING VALVE

The invention relates to a thermostatic mixing valve comprising a housing with a cold water, warm water and mixed water connection, as well as a valve arrangement and a thermostatic operating element which are arranged in the housing and, depending on a temperature setting apparatus and a quantity setting apparatus, determine the mixed water temperature and quantity.

A known mixing valve of this kind (U.S. Pat. No. 32 28 603) comprises a housing carrying the cold water connection and the mixed water connection axially juxtaposed at the periphery and the warm water connection at one end. At the opposite end, there is a knob for the quantity setting and a smaller knob for the temperature setting. Within the housing there is a thermostatic operating element as well as cold and warm water valves.

When there is damage to this mixing valve, for example calcification of the functionally important parts, the entire device has to be separated from the pipe circuit and replaced by a new device. This is expensive and excludes the possibility of permanent connections, for example by soldering.

The invention is based on the problem of providing a thermostatic mixing valve of the aforementioned kind that is easier to service.

This problem is solved according to the invention in that the housing is divided into a connection housing having the three connections and an attachment housing which carries the valve arrangement, the operating element and the setting apparatuses, and that the connection housing and attachment housing are each provided in the region of the dividing gap with three interacting connecting apertures sealed in pairs for cold, warm and mixed water.

In this construction, the connection housing contains only three conduit connections whilst all functionally important elements are combined in the attachment housing. In the case of damage, therefore, it is only necessary to remove and replace the attachment housing. Adjustment of these parts can already be done in the factory. Since the connection housing remains in the tube circuit, permanent connections such as soldered connections can be made. By arranging all connecting apertures at the dividing gap, one ensures that three connections for the cold water, warm water and mixed water are obtained simply by juxtapositioning.

Preferably, the three connecting apertures of the connection housing and attachment housing are each formed by bores with parallel axes. The two housings can then be put together in the direction of these axes.

It is of particular advantage if the three connecting apertures and securing means provided for securing the connection housing and attachment housing to each other are arranged point symmetrically about the centre point of the mixed water connection. The common connecting surface of the connection housing and attachment housing is therefore formed so that the two housing parts can be placed together in two different positions. When connecting a mixing valve, it is often found that the supply conduits for the hot and cold water are provided in reverse to the cold and hot water connections on the mixing valve. However, turning of the mixing valve is in most cases impossible because the resulting arrangement of the mixed water discharge nipples and the quantity and temperature setting elements would make it impossible to use them. Reversing the supply conduits is generally also impossible because the conduits are laid in the brickwork or behind the plastering. In the preferred embodiment, in one manner of assembly the hot water supply passage of the attachment housing lies opposite to the first supply passage of the connection housing whilst the cold water supply passage of the attachment housing lies opposite to the second supply passage of the connection housing. In the other position, the hot water passage of the attachment housing lies opposite to the second supply passage of the connection housing and the cold water passage of the attachment housing lies opposite to the first supply passage of the connection housing.

The mixed water passage is centrally disposed and therefore does not alter its position when turning the attachment housing relatively to the connection housing.

In particular, the three connecting apertures may be juxtaposed in a row.

Preferably, the dividing gap is planar and the axes of the connecting passage bores are normal to the dividing gap. This results in a particularly simple construction.

The seal can for example be effected by a flat seal covering the dividing gap. However, it is much better if, for the purpose of sealing the connecting apertures, plug sleeves are provided which sealingly engage with one section in a bore of the connection housing and with a second section in a bore of the attachment housing. Whereas flat seals are, depending on the tightness with which the connection housing and attachment housing are put together, subjected to very different loads and might therefore also be deformed, in the case of plug sleeves the sealing force obtained during installation remains substantially constant. This leads to a more effective seal. In addition, the plug sleeves take up part of the securing forces. Very simple securing means will therefore be sufficient.

More particularly, it will be enough if the attachment housing is secured to the connection housing merely by two screws parallel to the plug sleeves.

Preferably, each of the two sections of the plug sleeve is provided with a sealing ring. The dimensions of the plug sleeve, the receiving bore and the sealing ring determine the sealing force that is obtained during installation.

It is also favourable for the plug sleeve to be of a material which expands under pressure. If an elevated pressure is to be sealed, the plug sleeve becomes wider, thereby automatically increasing the sealing forces. Most plastics materials fulfil this condition.

In a preferred embodiment, the plug sleeve for the connecting apertures in the cold and/or warm water supply carries a screen. This dual function of the plug sleeve enables the screen to be accommodated without taking up too much space. In addition, it is easily replaceable.

Further, the plug sleeve for the connecting apertures in the mixed water supply may be made in one piece with a valve seat and/or a limiting abutment for the operating element. Here, again, the plug sleeve assumes a dual function.

It is of advantage if the setting apparatuses can be arranged on the connection housing with their operating elements in every desired position without changing their manner of operation. In particular, it is advantageous if the setting apparatuses can be arranged in two positions offset through 180° to each other. This ensures that, irrespective of how the hot water and cold water conduits are connected to the connection housing, the attachment housing can always be connected in a manner necessary for the temperature regulation and that the setting elements can be positioned independently of the setting of the connection housing in a manner that is necessary or convenient for the user.

Preferred examples of the invention will now be described in more detail with reference to the drawing, wherein.

Figure 1:
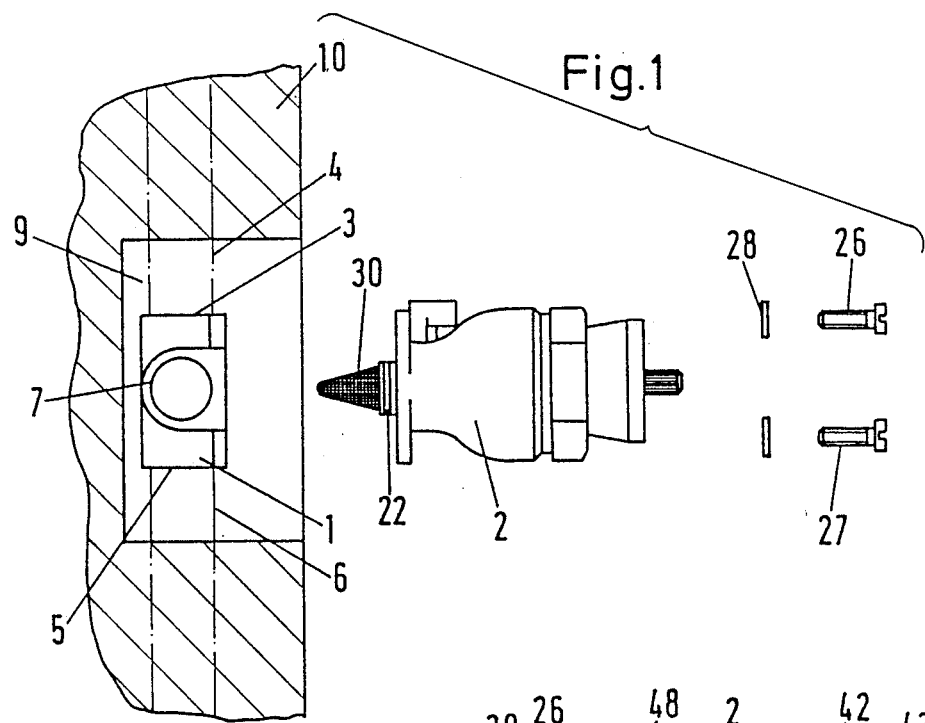
FIG. 1 shows the connection housing and attachment housing prior to assembly.
Figure 2:
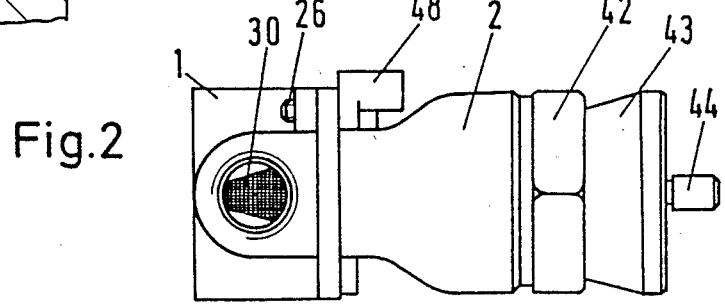
FIG. 2 shows the FIG. 1 components in the assembled condition.
Figure 3:
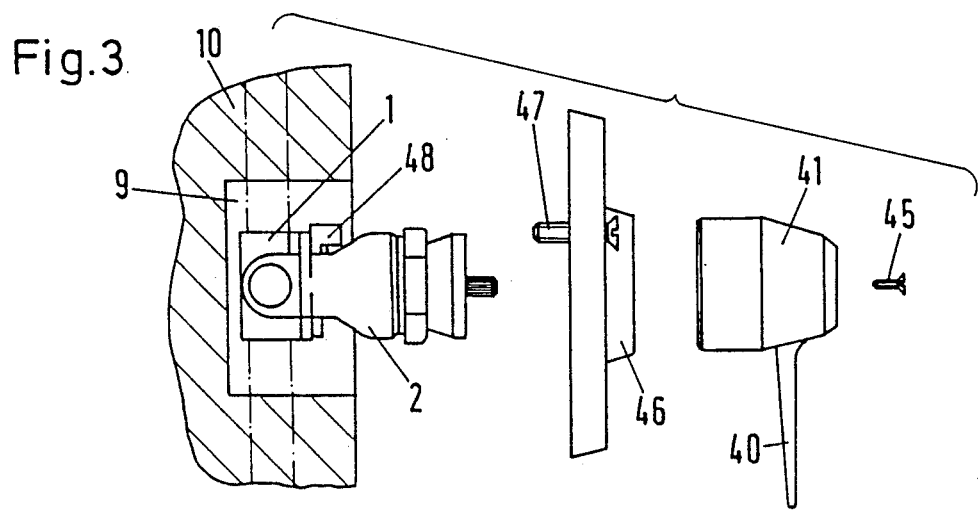
FIG. 3 shows the FIG. 2 arrangement with further fittings.
Figure 4:
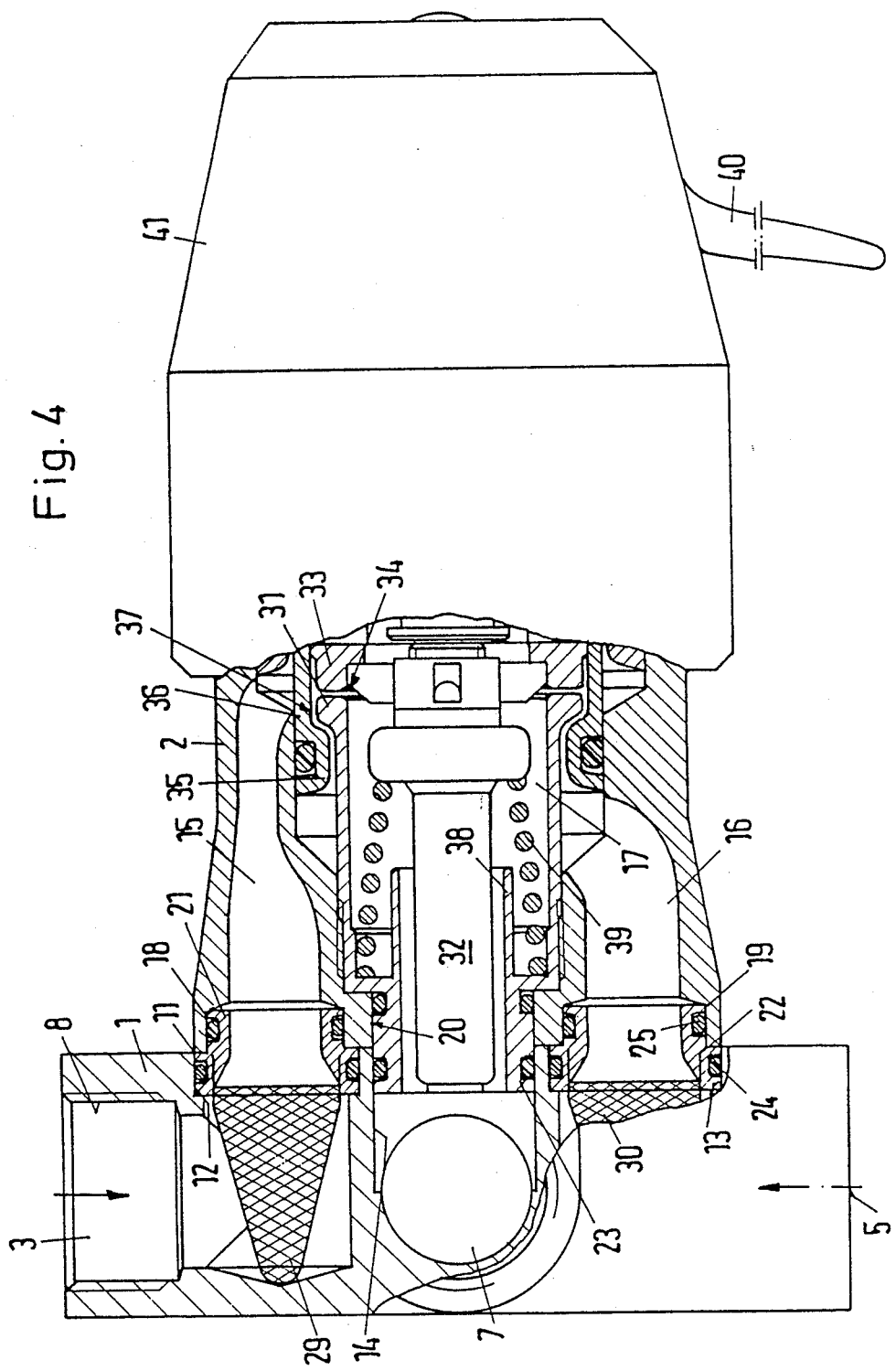
FIG. 4 is a part longitudinal section through the assembled mixing valve.

The illustrated mixing valve comprises a connection housing 1 and an attachment housing 2. The connection housing 1 comprises a connection 3 connected to a cold water conduit 4, a warm water connection 5 connected to a warm water conduit 6 and a mixed water connection 7 connected to a consumer. Preferably, the connection housing 1 is of metal such as brass. The conduits 4 and 6 are soldered on or connected by a screwthread 8. The connection housing is below plaster in a depression 9 of the wall 10.

Figure 5:
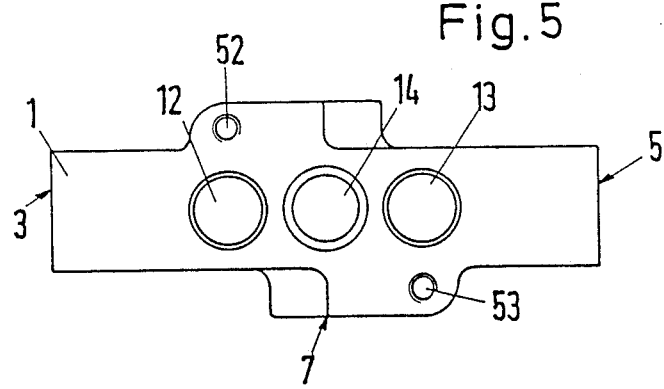
FIG. 5 is a plan view onto the connecting side of the connection housing.

Directed towards the planar dividing gap 11, there are three connecting apertures formed by a cold water connecting bore 12, a warm water connecting bore 13 and a mixed water connecting bore 14 therebetween. These three connecting apertures 12, 13 and 14 are point symmetrically disposed about the center point of the mixed water connecting bore 14. As will be evident from FIG. 5, the three bores 12, 13, 14 are juxtaposed in a row.

Figure 6:
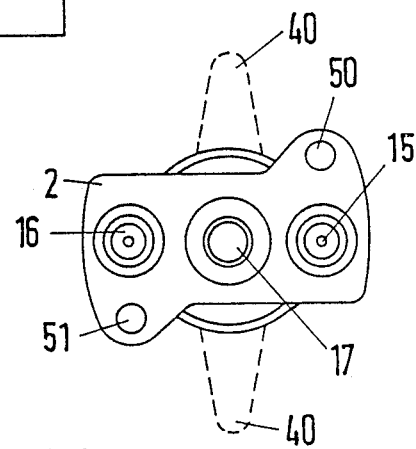
FIG. 6 is a plan view of the connection side of the attachment housing.

The attachment housing 2, which can be of plastics or metal, comprises a cold water passage 15, a warm water passage 16 and a mixed water passage 17 therebetween, all in juxtaposition. These passages again terminate at the dividing gap 11 with connecting apertures formed by connecting bores 18, 19 and 20. FIG. 6 shows a plan view onto the connection side of the connection housing. The cold water passage 15 lies point symmetrical about the center point of the mixed water passage 17 to the warm water passage 16. Depending on the position of the warm water passage, therefore, the attachment housing 2 can be assembled with the connection housing in the illustrated position or in a position turned through 180° about the central axes of the mixed water passage. It is therefore unimportant from which side the warm water and from which side the cold water are supplied.

Three plug sleeves 21, 22 and 23 engage with a respective first section in the bore 12, 13 or 14 of the connection housing 1 and with a second section in the bore 18, 19 or 20 of the attachment housing 2. Each section is provided with a sealing ring 24 and 25 acommodated in a groove, as is illustrated for the plug sleeve 22. These sealing rings may be additionally sealed with silicone grease. The plug sleeves 21, 22 and 23 are of plastics which tends to expand under the pressure of the supplied medium. To facilitate attachment, the bores 12, 13 and 14 as well as 18, 19 and 20 have parallel axes normal to the dividing plane 11.

For assembly, the plug sleeves 21, 22 and 23 are pushed either into the connection housing 1 or the attachment housing 2. The housings are then placed together by inserting the plug sleeves in the other housing and they are joined together with the aid of two screws 26 and 27 with interposed washers 28 (FIG. 1), the screws passing through bores 50 and 51 and being screwed into tapped holes 52 and 53. Since the holes 50 and 51 (FIG. 6) and the tapped holes 52 and 53 (FIG. 5) are likewise respectively disposed point symmetrically about the center point of the mixed water passage, securing of the attachment housing to the connection housing is possible in the two aforesaid positions.

The plug sleeves 21 and 22 each carry a screen 29 or 30 which is conical and can be supported at the base of the bore 18 or 19 with its tip. This screen is easily accessible for inspection, cleaning or replacement after the attachment housing 2 has been removed.

The plug sleeve 23 is made in one piece with a valve seat 31 which co-operates with a valve element 33 actuatable by a thermostatic operating element 32 such as a wax cartridge to form a warm water regulating valve 34. In addition, the valve seat 31 together with a bead 35 of a second valve element 35 forms a warm water setting valve 37 which serves to set the quantity and precedes the warm water regulating valve 34. The plug sleeve 23 is also provided in one piece with a sleeve-like abutment 38 for the operating element 32 and forms a counter-bearing for a spring 39 biasing this operating element.

For further details, attention is drawn to Applicants' other German application P 38 00 305 of even priority date ("Thermostatic mixing valve"). It will be evident therefrom that the attachment housing 2 also contains a cold water setting valve with a downstream cold water regulating valve. By actuating a pivoted lever 40, one can set the amount of mixed water. By turning a knob 41, one can set the desired temperature.

As already mentioned, all the valve elements and the thermostatic operating element are located in the interior of the attachment housing 2. An axially adjustable transmission element for the quantity setting and a rotary coupling 44 for the temperature setting project from the screw-on cover 42. The knob 41 can be pushed over the atachment housing 2 and secured to the coupling 44 by means of a screw 45. The lever 40 thereby acts as a wedge arrangement on the transmission element 43. The lever 40 acts on the transmission element 43 by way of a wedge arrangement. The knob 41 and the lever 40 can be placed in any desired angular position onto the coupling 44, which is preferably a polygon or a toothed shaft. It is particularly desirable for the lever 40 to be mounted in two positions at 180° to each other so that in each of these positions the attachment housing 2 assumes the same position. FIG. 6 shows two possible positions of the lever 40 in broken lines.

A cover plate 46 is also provided which can be secured by screws 47 to a screwthread 48 of the attachment housing 2 so that the depression 9 in the wall 10 is covered.

Figure 7A:
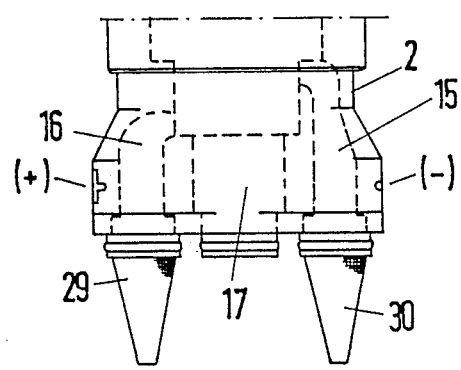
FIG. 7A is a diagrammatic side elevation of the attachment housing.
Figure 7B:
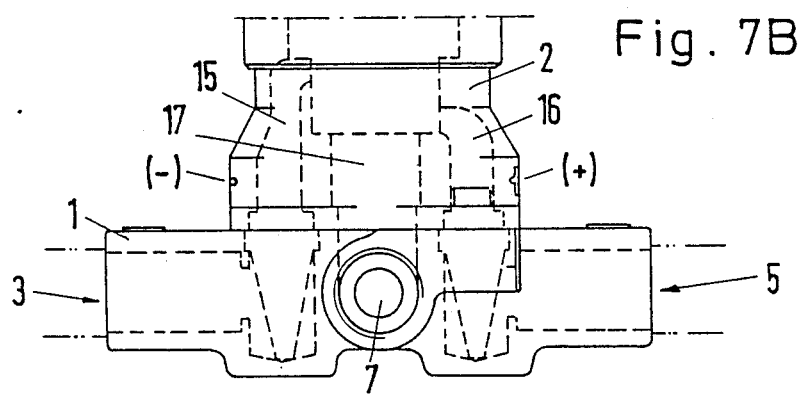
FIG. 7B is a diagrammatic side elevation of the attachment housing mounted in the connection housing turned through 180°.

FIGS. 7A and 7B each show a diagrammatic side elevation of the connection housing 2, the cold water passage 15, warm water passage 16 and mixed water passage 17 being indicated in broken line. In FIG. 7A, the attachment housing 2 is in a position for which it is necessary that the warm water be supplied through the connecting passage 3 and the cold water through the connecting passage 5 of the connection housing 1. FIG. 7B illustrates the reverse case, i.e. warm water is supplied through the connecting passage 5 and cold water through the connection 3. For easier assembly, there is a marking "+" on the exterior of the connection housing 2 for the warm water side and a marking "−" for the cold water side. During assembly, it is merely necessary to determine from which side the warm water and from which side the cold water are supplied. The attachment housing 2 is then so assembled with the connection housing 1 that the "+" sign points to the warm water side. After loosening the screw 45, the knob 41 and lever 40 can be detached from the attachment housing 4 and reapplied in a desired position, whereupon the screw 45 is tightened.

I claim:

1. A thermostatic mixing valve, comprising a connection housing having a first dividing surface, cold water and warm water inlet and mixing water outlet connections and mixing water inlet, and warm water and cold water outlet apertures opening to the mixing water outlet and warm water and cold water inlet connections respectively for conducting water therebetween; the cold and warm water outlet apertures and the mixed water inlet aperture opening through the first surface; an attachment housing having a second dividing surface for abutting against the first surface, cold, warm and mixed water passages for conducting water, and warm water, cold water and mixed water bores opening through the second surface for placing the cold water and warm water outlet and mixed inlet water apertures in direct fluid communication with the cold, warm and mixed water passages respectively when the second surface abuts against the first surface; operable valve means mounted within the attachment housing for controlling the relative quantity of cold water and warm water flow from the cold and warm water passages to the mixing water passage, and quantity and temperature control means, including a thermostatic element extending within the mixed water passage and mounted on the attachment housing for independently controlling the quantity and temperature of mixed water flowing out of the mixed water passage; and securing means for removably attaching the housings together with the first and second surfaces in removable abutting relationship with the cold, warm and mixed water bores opening directly to the cold water outlet, warm water outlet and mixed water inlet apertures respectively when the housings are secured together with their surfaces in abutting relationship.

2. A mixing valve according to claim 1, characterized in that each of the bores, cold and warm water outlet apertures and mixed water inlet aperture have a central axis that is parallel to each of the other axes.

3. A mixing valve according to claim 2, characterized in that the mixing water bore and mixing water inlet aperture axes are substantially coextensive when the housings are attached to one another, that the cold and warm water bore axes are symetrically located relative to the mixing water inlet aperture axis, that the securing means includes a first pair of tapped bores in one of the housing symmetrically located relative to the mixed water axis of the one housing, and a second pair of tapped bores in the other housing mixing water axis to be aligned with the one housing tapped bores when the housings are attached to one another.

4. A mixing valve according to claim 1, characterized in that the cold and warm water apertures and mixed water inlet aperture are arranged in a row and have parallel central axes, that the first and second surfaces are planar, and that the parallel axes are normal to the first surface.

5. A mixing valve according to claim 4, characterized in that the attachment housing has an annular wall portion defining the respective bore and that there is provided a plug sleeve for each bore that is in fluid sealing engagement with the wall portion defining the respective bore, each sleeve having a first sleeve section in the respective bore and a second sleeve section in the respective cold and warm water outlet aperture and the mixed water inlet aperture that the bore opens to.

6. A mixing valve according to claim 5, characterized in that the plug sleeves have parallel axes and that the securing means comprises only two screws that are parallel to the plug sleeves central axes, and that the two screws extend through the attachment housing and into the connection housing.

7. A mixing valve according to claim 1, characterized in that the mixed water bore and mixed water aperture have parallel central axes that are coextensive when the housings are secured to one another, that the housings are relative rotatable about the axes through an angle of 180° when mixed water bore and mixed water aperture open to one another and the housings are removable from one another, that the bores and apertures are relatively located on the housings that when the housings are rotatable 180° relative to one another about said axes, they are rotatable from a first position that the cold water outlet aperture opens directly to the cold water inlet bore and the warm water outlet aperture opens directly to the warm water inlet bore, and a second position that the cold water outlet aperture opens directly to the warm water inlet bore and the warm water outlet aperture opens directly to the cold water inlet bore and that the securing means includes means for securing the housings in the selected one of the first and second positions.

8. A mixing valve according to claim 7, characterized in that the control means including means for providing the same control of the temperature and quantity of mixed water regardless of whether the housings are secured in their first or second relative positions, the last mentioned means including a handle and mean for mounting the handle in the selected one of two positions on the handle mounting means that are offset 180° relative to one another.

9. A mixing valve according to claim 7, characterized in that the means for selectively securing the housings consists of a pair of first tapped holes in the connection housing symmetrical relationship relative to the mixing bore central axis and a second pair of tapped holes in the attachment housing symmetrically located relative to the mixing bore central axis and are aligned with the first tapped holes regardless of the two relative positions that the housing are rotated to.

10. A thermostatic mixing valve, comprising a connection housing having a first dividing surface, cold water and warm water inlet and mixing water outlet connections and mixing water inlet, and warm water and cold water outlet apertures opening to the mixing water outlet and warm water and cold water inlet connections respectively for conducting fluid therebetween; the cold and warm water outlet apertures and the mixed water inlet aperture opening through the first surface; an attachment housing having a second dividing surface for abutting against the first surface, cold, warm and mixed water passages and warm water, cold water and mixed water bores opening through the second surface for placing the cold water and warm water outlet and mixed inlet water apertures in fluid communication with the cold, warm and mixed water passages respectively, operative valve means mounted within the attachment housing for controlling the relative quantity of cold water and warm water flow from the cold and warm water passages to the mixing water passage, and quantity and temperature control means, including a thermostatic element extending within the mixed water passage and mounted on the attachment housing for independently controlling the quantity and temperature of mixed water flowing out of the mixed water passage; and securing means for removably attaching the housings together with the first and second surface in removable abutting relationship with the cold, warm and mixed water bores opening to the cold water outlet, warm water outlet and mixed water inlet apertures respectively, the attachment housing having an annular wall portion defining the respective bore and a plug sleeve for each bore that is in fluid sealing engagement with the wall portion defining the respective bore, each sleeve having a first sleeve section in the respective bore and a second sleeve section in the respective cold and warm water outlet aperture and the mixed water inlet aperture that the bore opens to, the plug sleeve in the mixed water bore being made in a single piece and having at least one of a valve seat that forms part of the control means and a limiting abutment for limiting the movement of the thermostatic element in one direction.

11. A thermostatic mixing valve, comprising a connection housing having a first dividing surface, cold water and warm water inlet and mixing water outlet connections and mixing water inlet, and warm water and cold water outlet apertures opening to the mixing water outlet and warm water and cold water inlet connections respectively for conducting fluid therebetween; the cold and warm water outlet apertures and the mixed water inlet aperture opening through the first surface; an attachment housing having a second dividing surface for abutting against the first surface, cold, warm and mixed water passages, warm water, cold water and mixed water bores opening through the second surface for placing the cold water and warm water outlet and mixed inlet water apertures in fluid communication with the cold, warm and mixed water passages respectively, operable valve means mounted within the housing for controlling the relative quantity of cold water and warm water flow from the cold and warm water pasages to the mixing water passage, and quantity and temperature control means, including a thermostatic element extending within the mixed water passage and mounted on the attachment housing for independently controlling the quantity and temperature of mixed water flowing out of the mixed water passage; securing means for removably attaching the housings together with the first and second surface in removable abutting relationship and the cold, warm and mixed water bores opening to the cold water outlet, warm water outlet and mixed water inlet apertures respectively, the first and second surfaces being planar, the cold and warm water outlet apertures and mixed water inlet connections being arranged in a row and having parallel central axes that are normal to the first surface, the attachment housing having an annular wall portion defining the respective bore and a plug sleeve for each bore that is in fluid sealing engagement with the wall portion defining the respective bore, each sleeve having a first sleeve section in the respective bore and a second sleeve section in the respective cold and warm water outlet aperture and the mixed water inlet aperture that the bore opens to, the plug sleeve in the mixed water bore being made in a single piece and having at least one of a valve seat that form a part of the control means and a limiting abutment for limiting the movement of the thermostatic element in one direction.

* * * * *